US009464799B2

(12) United States Patent
Zolotykh et al.

(10) Patent No.: US 9,464,799 B2
(45) Date of Patent: Oct. 11, 2016

(54) AIR COOLING OF ELECTRONIC DRIVER IN A LIGHTING DEVICE

(71) Applicant: LEDVANCE LLC, Wilmington, MA (US)

(72) Inventors: Valeriy Zolotykh, Abington, MA (US); Anil Jeswani, Beverly, MA (US); Arunuva Dutta, Winchester, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 14/405,176

(22) PCT Filed: Apr. 18, 2014

(86) PCT No.: PCT/US2014/034724

§ 371 (c)(1),
(2) Date: Dec. 3, 2014

(87) PCT Pub. No.: WO2014/176135

PCT Pub. Date: Oct. 30, 2014

(65) Prior Publication Data

US 2015/0159854 A1 Jun. 11, 2015

Related U.S. Application Data

(60) Provisional application No. 61/814,330, filed on Apr. 21, 2013.

(51) Int. Cl.

| | |
|---|---|
| ***B60Q 1/06*** | (2006.01) |
| ***F21V 29/00*** | (2015.01) |
| ***F21V 29/70*** | (2015.01) |
| ***F21V 29/71*** | (2015.01) |
| ***F21V 29/83*** | (2015.01) |
| ***F21V 29/89*** | (2015.01) |
| ***F21V 23/00*** | (2015.01) |
| *F21Y 101/02* | (2006.01) |
| *F21Y 101/00* | (2016.01) |

(52) U.S. Cl.

CPC ................. *F21V 29/70* (2015.01); *F21K 9/23* (2016.08); *F21V 23/007* (2013.01);

(Continued)

(58) Field of Classification Search

CPC .... F21V 29/004; F21V 29/89; F21V 23/007; F21V 29/713; F21V 29/83; F21V 29/70; F21K 9/1375; F21K 9/23; F21Y 2101/02; F21Y 2101/00

USPC .................................................. 362/373, 294

See application file for complete search history.

(56) References Cited

U.S. PATENT DOCUMENTS

| | | | | |
|---|---|---|---|---|
| 7,575,346 | B1 * | 8/2009 | Horng | F21V 29/02 362/294 |
| 8,388,197 | B1 | 3/2013 | Huang et al. | |

(Continued)

FOREIGN PATENT DOCUMENTS

| | | | |
|---|---|---|---|
| CN | 101 769 521 | A | 7/2010 |
| CN | 201 568 765 | U | 9/2010 |

(Continued)

OTHER PUBLICATIONS

Remko Dinkla, International Search Report and Written Opinion of the International Searching Authority for PCT/US2014/034724, Jul. 28, 2014, pp. 1-10, European Patent Office, Rijswijk, The Netherlands.

*Primary Examiner* — Anh Mai
*Assistant Examiner* — Glenn Zimmerman
(74) *Attorney, Agent, or Firm* — Andrew Martin

(57) ABSTRACT

A lighting device including one or more solid state light sources providing air cooling of the electronic driver is disclosed. The driver receives power and provides it to the light source(s). The device also includes a first and a second housing. The first housing contains, at least in part, the driver, and includes a support having an exterior and an interior, that provides mechanical support to the second housing connected thereto. The interior includes a firstopening. The second housing is a heat sink for the device. The second housing has an interior portion, with a second opening corresponding to the first opening, and an exterior portion, having a plurality of external openings. Air entering an external opening is able to mix with air in the first housing by flowing through the first opening and the corresponding second opening, which cools the electronic driver.

16 Claims, 8 Drawing Sheets

(52) U.S. Cl.
CPC .......... *F21V 29/004* (2013.01); *F21V 29/713* (2015.01); *F21V 29/83* (2015.01); *F21V 29/89* (2015.01); *F21Y 2101/00* (2013.01); *F21Y 2101/02* (2013.01)

(56) References Cited

U.S. PATENT DOCUMENTS

2008/0315133 A1* 12/2008 Jung .......................... F26B 3/28
250/504 R
2009/0237932 A1* 9/2009 Lee ........................ F21K 9/1375
362/249.02
2011/0037387 A1* 2/2011 Chou ...................... F21K 9/135
315/35
2011/0193463 A1* 8/2011 Daniel .................. F21V 29/004
313/46
2012/0224381 A1 9/2012 Hashimoto et al.
2014/0021849 A1 1/2014 Yu et al.

FOREIGN PATENT DOCUMENTS

EP 0 100 121 A2 2/1984
EP 2 180 249 A1 4/2010

* cited by examiner

500B

500A

AIR COOLING OF ELECTRONIC DRIVER IN A LIGHTING DEVICE

CROSS-REFERENCE TO RELATED APPLICATIONS

The present application is a National Stage application of, and claims priority to, International Application No. PCT/US2014/034724, filed Apr. 18, 2014 and entitled "AIR COOLING OF ELECTRONIC DRIVER IN A LIGHTING DEVICE", which claims priority of U.S. Provisional Patent Application No. 61/814,330, filed Apr. 21, 2013 and entitled "ELECTRONIC DRIVER AND COOLING THEREOF", the entire contents of both of which are hereby incorporated by reference.

TECHNICAL FIELD

The present invention relates to lighting, and more specifically, to electronic drivers for solid state light sources.

BACKGROUND

As lighting technology further embraces the use of solid state light sources, lighting devices must continue to address the heat generated by the solid state light sources. A lighting device having one of the well-known lamp shapes (e.g., A19, PAR20, BR30, etc.) has typically used a metal finned heat sink to address that heat. Other solutions have ranged from the use of small fans to circulate air to liquid cooling of the solid state light sources. Another solution has involved the solid state light sources themselves. That is, as the solid state light sources have become more efficient, they now generate more light with less heat.

SUMMARY

The most common conventional technique for dealing with heat in a lighting device having a typical lamp shape is the metal finned heat sink. Such heat sinks, however, suffer from a variety of deficiencies. For example, a typical die cast metal finned heat sink dissipates heat from one or more solid state light sources, and possibly from other electronic components, to the local ambient environment by natural convection. These traditional technologies use bigger thermal mass and surface area to dissipate the heat and to keep the temperature of components within desired limits. This results in both higher cost and added weight.

Embodiments of the present invention provide a more efficient thermal design that, combined with selection of materials and manufacturing processes for fabrication of the heat sink, result in lower manufacturing costs and less weight, while improving thermal performance due to a higher thermal conductivity of the material of the heat sink by using air flow to dissipate heat. Embodiments disclosed herein provide a sheet metal heat sink as a thermal management system, wherein the sheet metal heat sink is made from an aluminum sheet metal, such as but not limited to Al 1060. This offers over two times higher a thermal conductivity than traditional die case aluminum heat sinks made from Al 380 (234 W/mk for Al 1060, 109 W/mk for Al 380). The sheet metal heat sink is approximately half of the weight and has lower manufacturing and tooling costs. By providing a plurality of openings in the heat sink, along with one or more interior openings via a support that allow air to flow into and out of the portion of the device including the electronic driver, embodiments dissipate heat more efficiently.

In an embodiment, there is provided a lighting device. The lighting device includes: a solid state light source; an electronic driver for the solid state light source configured to receive power from a power source and to provide the power to the solid state light source; a first housing that contains, at least in part, the electronic driver, and comprises a support, wherein the support comprises an exterior and an interior, wherein the interior comprises a first opening; and a second housing connected to the first housing, such that the support of the first housing provides mechanical support to the second housing, wherein the second housing is a heat sink for the lighting device and comprises an interior portion and an exterior portion, wherein the exterior portion comprises a plurality of external openings, wherein the interior portion comprises a second opening corresponding to the first opening of the first housing, such that air entering an external opening in the plurality of external openings is able to mix with air located in the first housing by flowing through the first opening and the corresponding second opening, so as to cool the electronic driver.

In a related embodiment, the first housing may include a first support, a second support, and a third support, wherein each support may include an exterior and an interior, and wherein each interior of each support may include a first opening. In a further related embodiment, the plurality of external openings may include a first set of external openings and a second set of external openings, wherein the first set of external openings may be located between the first support, the second support, and the third support. In a further related embodiment, the second set of external openings may be located on a side of the exterior portion of the second housing that is opposite to the first set of external openings.

In another further related embodiment, the first set of external openings may include three external openings, and each of the three external openings may be located between two of the first support, the second support, and the third support.

In yet another further related embodiment, the first set of external openings may be shaped similarly to the second set of external openings. In still another further related embodiment, the first set of external openings may include at least two openings having a different shape.

In another related embodiment, the first housing and the second housing are integral. In a further related embodiment, the integral first housing and second housing are formed from a single material.

In still another related embodiment, the first housing may further include a plurality of external openings. In yet another related embodiment, the first housing may include a driver chamber and a support, wherein the support may be connected to the driver chamber, wherein the driver chamber may contain, at least in part, the electronic driver, and wherein the support may include an exterior and an interior, wherein the exterior of the support may extend outward from the driver chamber, and wherein the interior of the support may include a first opening, such that air is able to flow into and out of the driver chamber. In a further related embodiment, the driver chamber may include a wall, wherein the wall may include a third opening, and wherein the third opening may correspond to the first opening of the support, such that air is able to flow into and out of the driver chamber via the third opening in the wall of the driver chamber.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
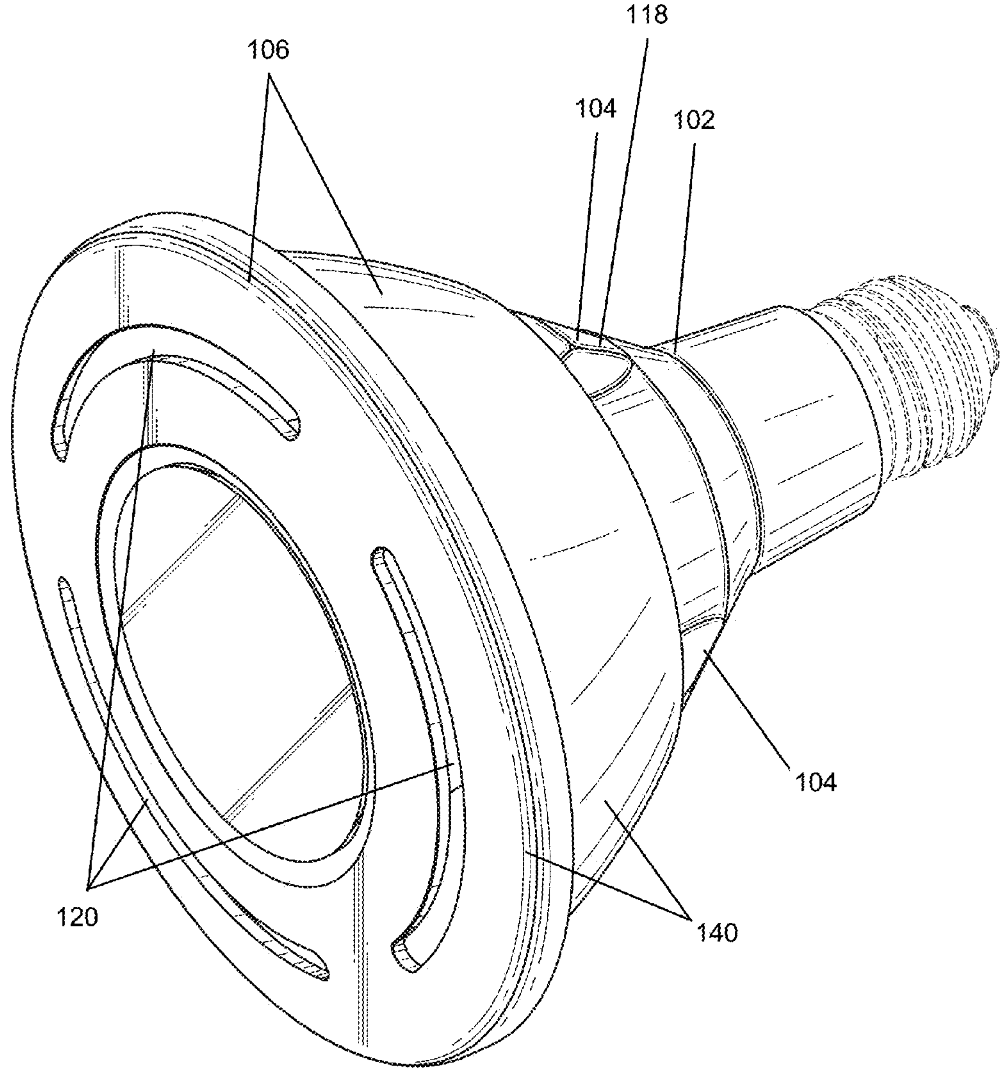
FIG. 1 shows a perspective view of a lighting device according to embodiments disclosed herein.
Figure 2:
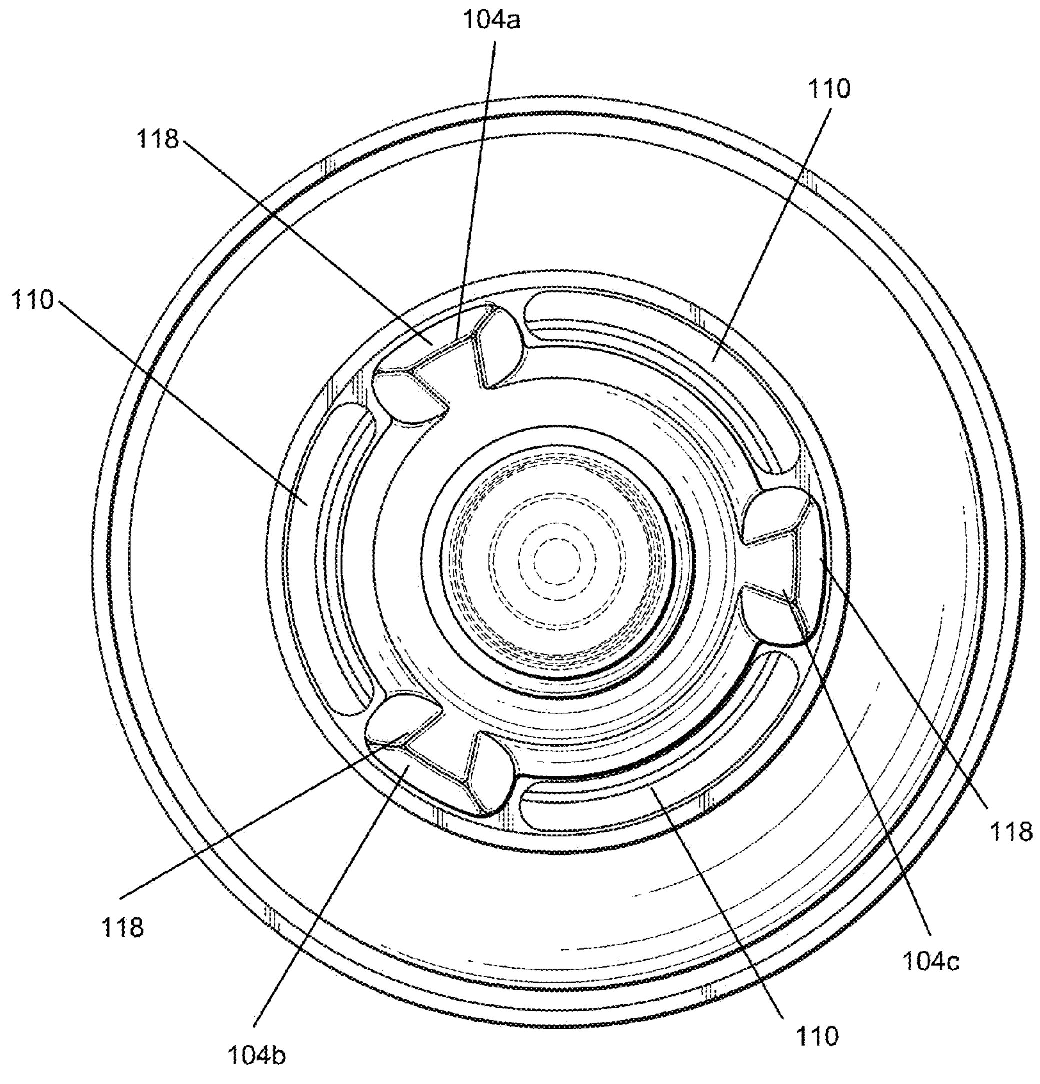
FIG. 2 shows another view of a lighting device according to embodiments disclosed herein.

FIG. 1 shows a lighting device 100. Though the lighting device 100 is shown in FIG. 1 as having the shape of a typical PAR38 lamp, embodiments are not so limited and may and do take the form of any type of known lighting device, including but not limited to a lamp, a light engine, a module, and so forth. The lighting device includes a first housing 102 and a second housing 106. The second housing 106 also serves as the heat sink for the lighting device 100. The second housing 106 as shown in FIG. 1 includes two parts, a top and a bottom, though in other embodiments, such as shown in FIG. 2, the second housing 106 is formed of a single piece. The second housing 106 includes an exterior portion 140 and an interior portion 142 (not shown in FIG. 1 but shown in FIGS. 4 and 6). Within the second housing 106, in some embodiments within the interior portion 142, is located one or more solid state light source(s) 192, such as but not limited to one or more light emitting diode(s), organic light emitting diode(s), polymer light emitting diode(s), organic light emitting compound(s), and the like (not shown in FIG. 1 but shown in FIG. 4). Thermal grease, or other heat spreading material, is applied to the mating surfaces of the one or more solid state light source(s) 192 and the second housing 106 for efficient transfer and spreading of heat from the one or more solid state light source(s) 192 to the ambient around the lighting device 100.

Figure 4:
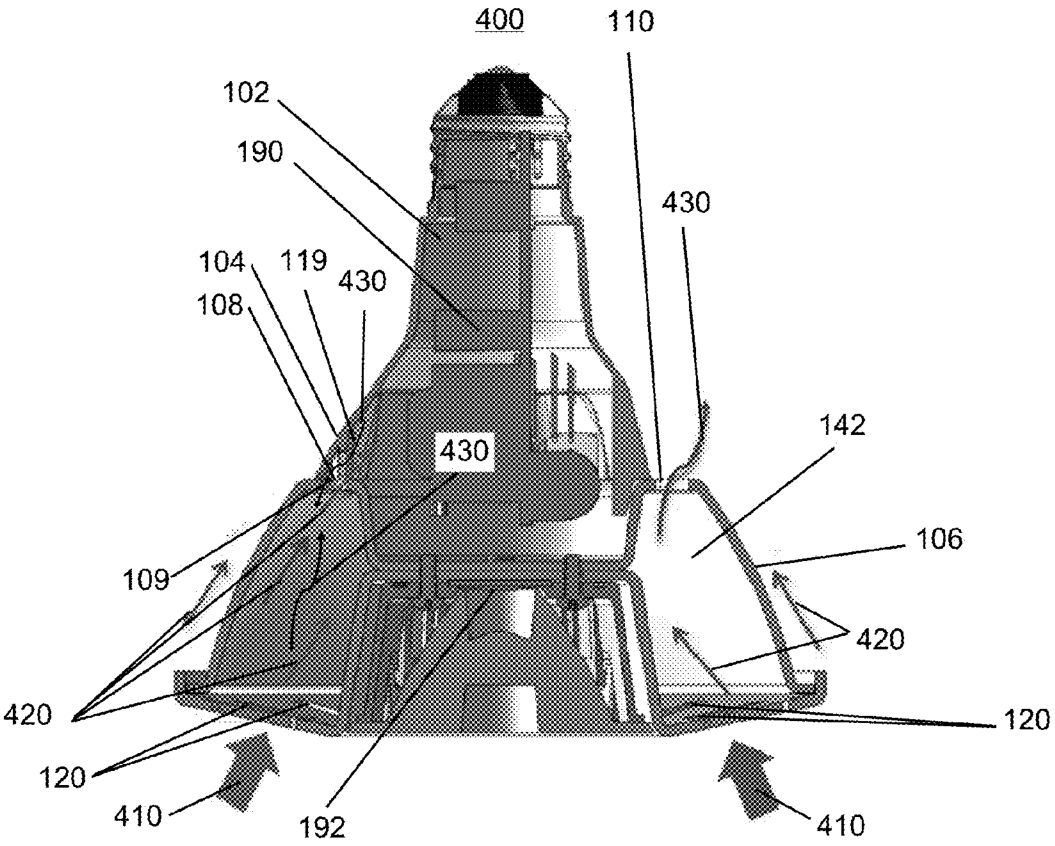
FIG. 4 shows a cross-section of a lighting device according to embodiments disclosed herein.

The first housing 102 contains, at least in part, an electronic driver 190 (not shown in FIG. 1 but shown in FIG. 4) for the one or more solid state light source(s) 192 (not shown in FIG. 1 but shown in FIG. 4). The electronic driver 190 is configured to receive power from a power source (not shown) and to provide the power to the solid state light source(s) 192. Thus, in some embodiments, at least a part of the electronic driver 190 extends into the second housing 106. The first housing 102 includes at least one support 104, though the perspective view of FIG. 1 shows two supports 104. The support 104 includes an exterior 118 and an interior 119 (not shown in FIG. 1 but shown in FIGS. 4 and 8). The interior 119 of the support 104 includes a first opening 108 (not shown in FIG. 1 but shown in FIGS. 4, 6, and 8). The first housing 102 and the second housing 106 are connected to each other, at least via the support 104, such that the support 104 provides mechanical support to the second housing 106.

Figure 3:
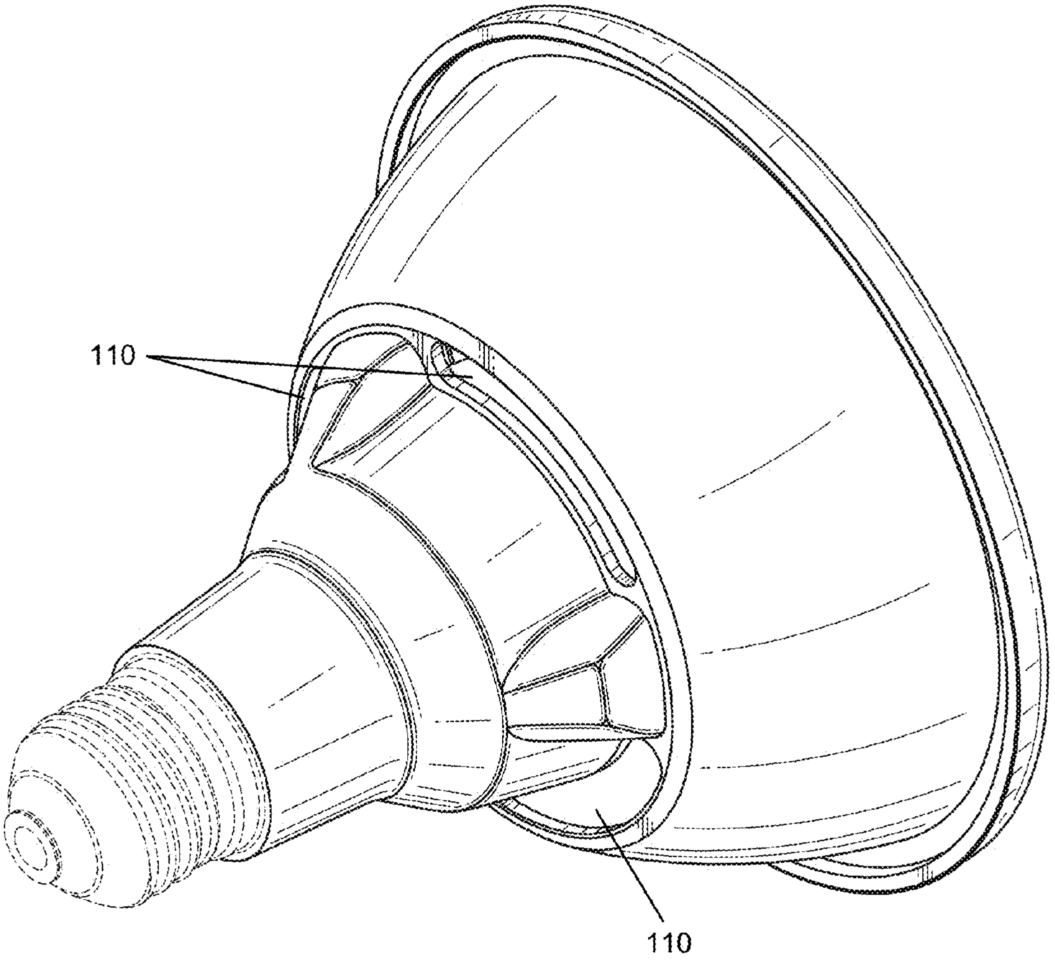
FIG. 3 shows another perspective view of a lighting device according to embodiments disclosed herein.

The exterior portion 140 of the second housing 106 comprises a plurality of external openings 110, 120 (shown together in the cross-sectional view of FIG. 4 and separately elsewhere). The plurality of external openings 110, 120 includes a first set of external openings 110 (not shown in FIG. 1) and a second set of external openings 120 (shown in FIG. 1). In some embodiments, the first set of external openings 110 are located near the support 104 (see, e.g., FIG. 2), and the second set of external openings 120 are located on a side of the exterior portion 140 of the second housing 106 that is opposite to the first set of external openings 110 (see, e.g., FIG. 4). In embodiments where there are, for example, three supports 104*a*, 104*b*, 104*c*, such as shown in FIG. 2, the first set of external openings 110 are located between a first support 104*a*, a second support 104*b*, and a third support 104*c*. In some embodiments, where the first set of external openings 110 comprises three external openings 110, such as shown in FIGS. 2 and 3, each of the three external openings in the first set of external openings 110 are located between two of the first support 104*a*, the second support 104*b*, and the third support 104*c*. Further details regarding sizes, shapes, and numbers of the plurality of second openings 110, 120 are discussed in greater detail below.

Figure 6:
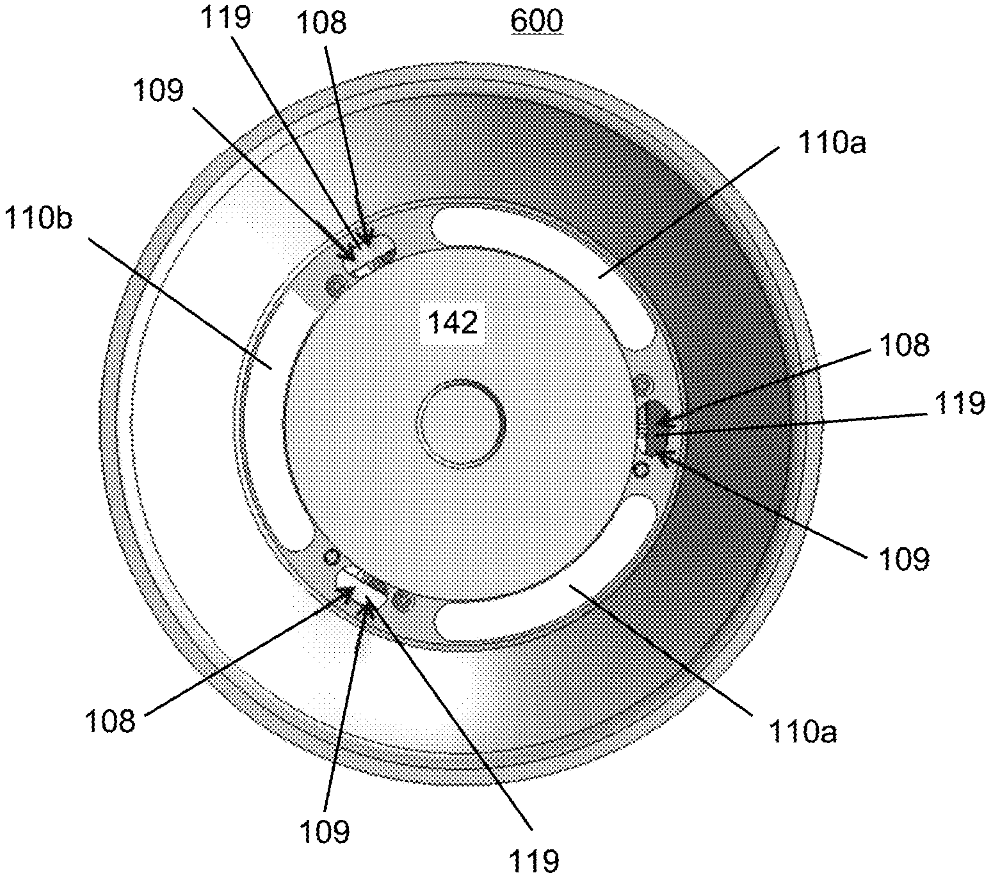
FIG. 6 shows an interior of a lighting device according to embodiments disclosed herein.
Figure 8:
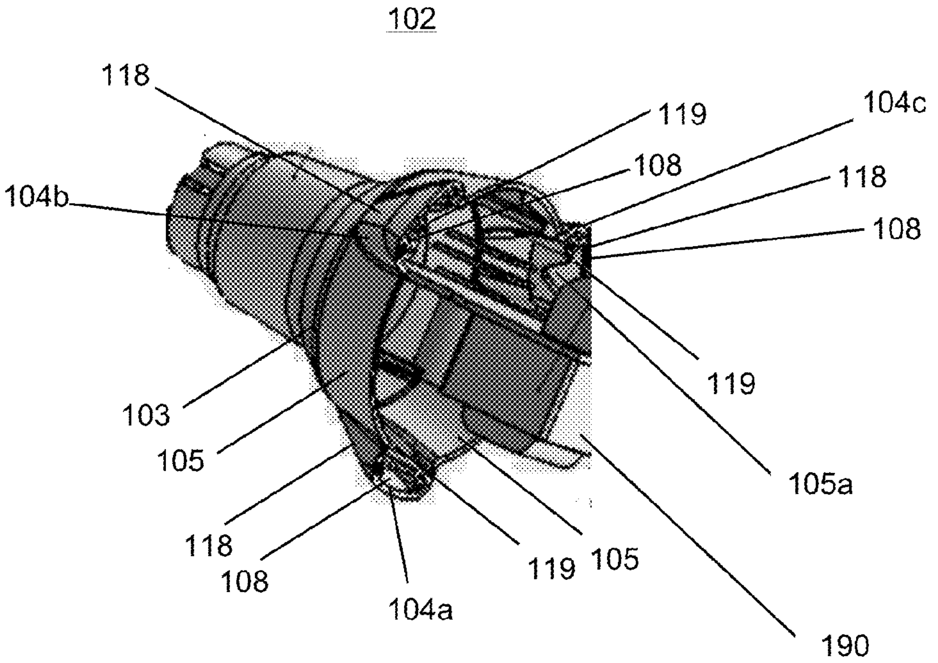
FIG. 8 shows a first housing of a lighting device having a plurality of supports according to embodiments disclosed herein.

The first housing 102 also includes a first opening 108, and in some embodiments a plurality of first openings 108 (not shown in FIG. 1 but shown in FIGS. 4, 6, and 8). As described above, the first opening 108 is located on an interior of the first housing 102, more particularly, on the interior 119 of the support 104. Correspondingly, the interior 142 of the second housing 106 includes a second opening 109, and in some embodiments a plurality of second openings 109 (not shown in FIG. 1 but shown in FIGS. 4 and 6). The second opening 109 corresponds to the first opening 108, such that, when the first housing 102 and the second housing 106 are connected via the support(s) 104, the first opening 108 and the second opening 109 at least partially overlap with each other. Of course, in some embodiments, the first opening 108 and the second opening 109 substantially overlap with each other, such as shown in FIG. 6. The first opening 108 and its corresponding second opening 109 allow air that enters an external opening in the plurality of external openings 110, 120 in the second housing 106 to mix with air located in the first housing 102 by flowing through the first opening 108 and its corresponding second opening 109, so as to cool the electronic driver 190 located, at least in part if not entirely within the first housing 102.

The second housing 106, in some embodiments, is designed for Aluminum1060 (Al 1060) material. The thermal conductivity of Al 1060 is about 234 W/mK. The thermal conductivity of die cast aluminum alloy, Al 380, is about 108 W/mK. Due to higher thermal conductivity of sheet metal material Al 1060, the heat path from a heat source (e.g., solid state light source and/or driver) to the surrounding ambient is very efficient; this translates to lower thermal resistance from the heat source to the surrounding ambient. This helps to keep the temperature of the one or more solid state light source(s) (e.g., solder point and junction temperature) lower, which in turn helps to increase the luminous flux output therefrom. Also due to high thermal conductivity of Al 1060, the surface area required to dissipate the heat is lower compared to the traditional die cast aluminum alloy with lower thermal conductivity. In some embodiments, the thickness of portions of the second housing 106 are 2 mm and/or substantially 2 mm, and the thickness of other portions of the second housing 106 are 1.8 mm and/or substantially 1.8 mm, though of course other thicknesses are also used in some embodiments. These thicknesses were selected to give best performance at lower cost and optimized to conduct more heat to the exterior of the lighting device 100 and thus also help to dissipate more heat by convection, due to more utilization of frontal surface area, and conduction.

Figure 7:
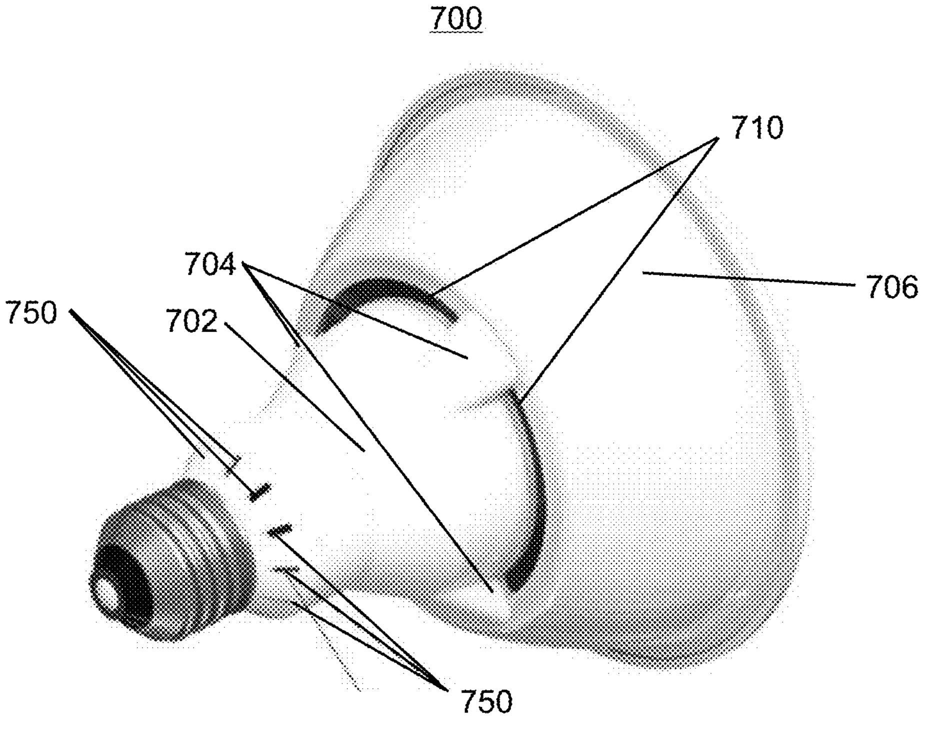
FIG. 7 shows a lighting device including a plurality of third openings on a first housing according to embodiments disclosed herein.

In some embodiments, the first housing and the second housing are integral, such as shown in FIG. 7. In some such embodiments, the integral first housing 102 and second housing 106 are formed from a single material, such as but not limited to a metal, a thermal plastic material, and so forth.

In some embodiments, such as can be seen in FIGS. 1 and 2, the first set of external openings 110 are shaped similarly to the second set of external openings 120. In some embodiments, the first set of external openings 110 and the second set of external openings 120 are the same in number. In some embodiments, such as can be seen in the cross-sectional view of FIG. 4, the first set of external openings 110 and the second set of external openings 120 are different in number. In some embodiments, such as shown in FIG. 6, the first set of external openings 110 includes at least two openings 110*a*, 110*b* having a different shape.

As shown throughout, the plurality of external openings 110, 120 of the second housing 106 are strategically located to increase and/or accelerate the movement of air (more turbulence) and dissipate more heat to the low temperature ambient air surrounding a lighting device according to embodiments. The size, shape, and location of these external openings on the second housing 106 are optimized to help increase air movement, which in turn will help to dissipate more heat to surrounding air by convection. In some embodiments, at least some of the second set of external openings 120 are each shaped like, for example, isosceles triangles, with each vertex being rounded, though in some embodiments, only the non-isosceles vertex is rounded, and in some embodiments, only the isosceles vertices are rounded. In some embodiments, only one of the vertices is rounded. In some embodiments, only two of the vertices are rounded. In some embodiments, the second set of external openings 120 is arranged in a particular pattern, such as but not limited to pattern of a particular two-dimensional shape, such as but not limited to a circular pattern, an ovular pattern, and polygonal pattern, and so on. In some embodiments, the second set of external openings 120 are arranged in the same way (e.g., with the non-isosceles vertex of each opening pointing out, with the non-isosceles vertex of each opening pointing in, with the non-isosceles vertex of each opening pointing left or right, etc.). In some embodiments, the second set of external openings 120 are arranged differently (e.g., with the non-isosceles vertex of a first, a third, a fifth, and so on openings pointing out and the non-isosceles vertex of a second, a fourth, a six, and so on openings pointing in, etc.). In some embodiments, the set second of external openings 120 are shaped in a two-dimensional shape other than an isosceles triangle, such as but not limited to an ovular shape, a race track shape, an elliptical shape, and so on, and in some embodiments, combinations of different shapes and/or different orientations thereof are used.

FIG. 4 shows a cross section 400 of a lighting device that is similar to the lighting device 100 of FIGS. 1-3. The cross section 400 shows the first housing 102, the second housing 106, and the support 104 therebetween. The first housing 102 includes, at least in part, the electronic driver 190. The interior 119 of the support 104 includes a first opening 108, with a corresponding second opening 109 in the second housing 106. The second housing 106 includes a plurality of external openings 110, 120, which allow air to travel from outside of the lighting device to the interior portion 142 of the second housing 106. The first opening 108 in the support 104 and the corresponding second opening 109 also allow air to travel within and between the first housing 102 and the second housing 106. More specially, in FIG. 4, there are shown various arrows that represent, at least in part, air flow in, out, and around the lighting device 400. Low temperature ambient air is shown by thick arrows 410 pointing towards the second set of external openings 120. Low temperature air within and around the lighting device is shown by thin arrows 420. Warmer temperature air is shown within and the around the lighting device by curvy arrows 430. Thus, as air interacts with the walls of the second housing 106, it extracts heat by convection and the warmer air exits the lighting device via at least the second set of external openings 110. Of course, the arrows 410, 420, and 430 shown in FIG. 4 are merely for ease of explanation and do not represent a complete description of the flow of air in and around a lighting device according to embodiments described herein.

Figure 5B:
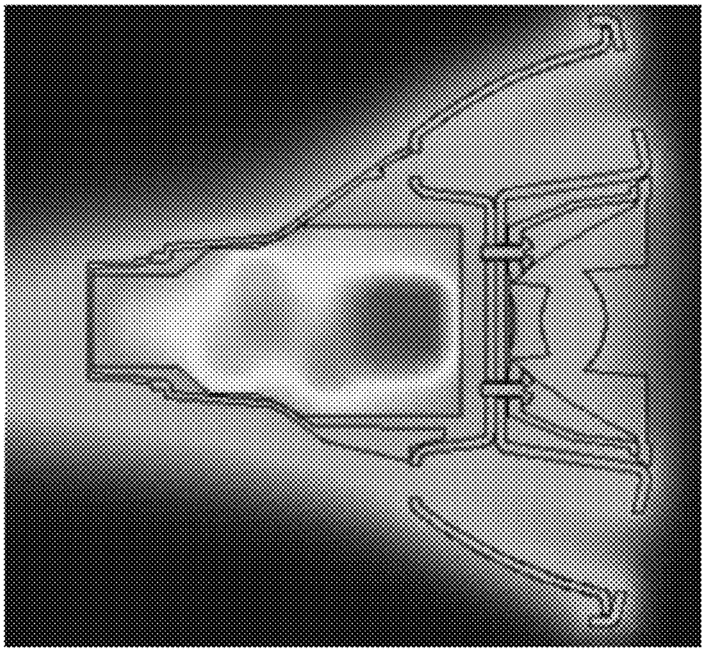
FIGS. 5A and 5B show the results of thermal simulations performed on a lighting device according to embodiments disclosed herein.
Figure 5A:
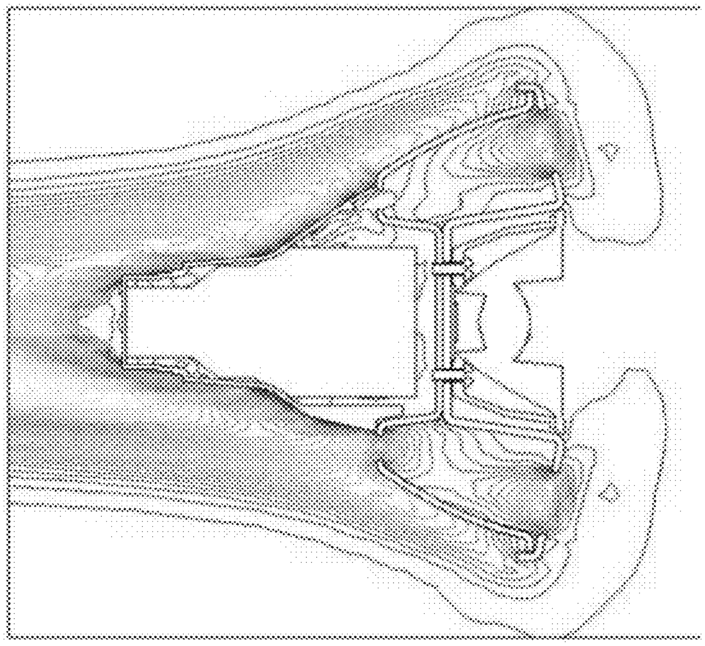

FIGS. 5A and 5B show results 500A and 500B from thermal simulations. The results 500A show the air flow distribution within a cross section of a lighting device according to embodiments disclosed herein. Thermal gradients on a cross section of a lighting device according to embodiments disclosed herein are presented by the results 500B. As seen from the simulations results 500A and 500B in FIGS. 5A and 5B, air as it enters the lighting device extracts heat from the surfaces via convection. As the thermal conductivity of the materials forming the lighting device is good, the thermal resistance is lower, which results in a lower temperature differential. This also helps in extracting more heat from the lighting device via thermal radiation.

FIG. 6 shows a portion 600 of the lighting devices 100 and 400 shown in FIGS. 1-4, where an upper portion of the lighting device is removed and the interior portion 142 of the second housing 106 is shown, along with a portion of first housing 102, in particular, the interior 119 of each support 104*a*, 104*b*, 104*c* visible through each of the first openings 108 and corresponding second openings 109. The first openings 108 and the corresponding second openings 109 allow for air from inside the first housing 102 to circulate through the first set of external openings 110*a*, 110*b*, 110*c* in the second housing 106, along with the second set of external openings 120 (not shown in FIG. 6), respectively, as well as to allow air that enters the lighting device to enter into the first housing 102. The air travels through the first openings 108 and the corresponding second openings 109 down the supports of the first housing 102 into the first housing 102. These air movements help to reduce the temperature on the electronic driver 190 (not shown in FIG. 6) and its components, which helps to improve device reliability and life. Keeping the temperature of the electronic driver 190 and its components down also helps to improve performance thereof. In addition to providing a path for air, the supports 104 of the first housing 102 also mechanically support the second housing 106, as discussed above.

Though throughout the drawings and descriptions thereof, reference is made to three supports, and thus three first openings in the first housing and three corresponding second openings in the second housing, of course embodiments may and do use any number of supports, first openings, and corresponding second openings. In some embodiments, not every support has a first opening. In some embodiments, the second set of external openings in the second housing are not all located between two of the supports.

FIG. 7 shows a lighting device 700 having a first housing 702 and a second housing 706. The first housing 702 includes a plurality of supports 704, including a plurality of first openings (not shown). The second housing 706 includes a plurality of external openings 710, some of which are located between ones of the plurality of supports 704. The second housing 706 also includes a plurality of second openings corresponding to the first openings (not shown), as described throughout. The first housing 702 includes, at least in part, a driver (not shown) and a plurality of third openings 750. Though FIG. 7 shows the plurality of third openings 750 in a region of the first housing 702 that is opposite where the first housing 702 is connected to the second housing 706 via the plurality of supports 704, embodiments are not so limited, and thus the plurality of third openings 750 may be, and in some embodiments are, located anywhere on the first housing 702. The plurality of third openings 750 in the first housing 702 help to further reduce the temperature of the driver and/or its components, which helps to improve the lifetime and reliability of the lighting device 700 and the performance of the driver. As low temperature ambient air moves through the lighting device 700 from the plurality of external openings on a top portion of the lighting device 700 (not shown in FIG. 7), to the plurality of external openings 710, the air removes heat from the driver and/or its components via convection, as described above, and warmer air escapes though, among other openings, the plurality of third openings 750 on the first housing 702.

FIG. 8 shows the first housing 102*a*. In FIG. 8, the first housing includes a first support 104*a*, a second support 104*b*, and a third support 104*c*, with each support 1-104*a*, 104*b*, 104*c* including an exterior 118 and an interior 119, and each interior 119 includes a first opening 108. The first housing 102*a* also includes a driver chamber 103. Each support 104*a*, 104*b*, 104*c* is connected to the driver chamber 103, such that air is able to flow into and out of the driver chamber 103 via the first openings 108. The driver chamber 103 includes, at least in part, the electronic driver 190 (partially shown in FIG. 8). Each support 104*a*, 104*b*, 104*c* extends outward from the driver chamber 103. The driver chamber 103 includes a wall 105. The wall 105 has at least one third opening 105*a* that corresponds to the first opening 108 of a support 104*c*, such that air is able to flow into and out of the driver chamber 103 via the third opening 105*c* in the wall 105 of the driver chamber 103 via the support 104*c*.

Though embodiments have been described as having the second housing comprising sheet metal, of course, one or more other materials (metals, non-metals, and combinations thereof) are used in some embodiments, provided that the material is capable of having openings, supporting air flow, and acting as a thermal management system as described throughout, though of course the actual performance of the one or more other materials may be different than that of embodiments where the second housing is made of sheet metal.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A lighting device, comprising:

a solid state light source;

an electronic driver for the solid state light source configured to receive power from a power source and to provide the power to the solid state light source;

a first housing that contains, at least in part, the electronic driver, and comprises a support, wherein the support comprises an exterior and an interior, wherein the interior comprises a first opening; and a second housing connected to the first housing, such that the support of the first housing provides mechanical support to the second housing, wherein the second housing is a heat sink for the lighting device and comprises an interior portion and an exterior portion, wherein the exterior portion comprises a plurality of external openings, wherein the interior portion comprises a second opening corresponding to and substantially co-planar with the first opening of the first housing, such that air entering an external opening in the plurality of external openings is able to mix with air located in the first housing by flowing through the first opening and the corresponding second opening, so as to cool the electronic driver.

2. The lighting device of claim 1, wherein the first housing comprises a first support, a second support, and a third support, wherein each support comprises and exterior and an interior, and wherein each interior of each support comprises a first opening.

3. The lighting device of claim 1, wherein the first housing and the second housing are integral.

4. The lighting device of claim 1, wherein the first housing further comprises a plurality of external openings.

5. The lighting device of claim 1, wherein the first housing comprises a driver chamber and a support, wherein the support is connected to the driver chamber, wherein the driver chamber contains, at least in part, the electronic driver, and wherein the support comprises an exterior and an interior, wherein the exterior of the support extends outward from the driver chamber, and wherein the interior of the support comprises a first opening, such that air is able to flow into and out of the driver chamber.

6. The lighting device of claim 1, wherein the support is located on an exterior of the first housing.

7. The lighting device of claim 1, wherein at least one of the exterior openings is co-planar with the second opening.

8. The lighting device of claim 2, wherein the plurality of external openings comprises a first set of external openings and a second set of external openings, wherein the first set of external openings are located radially between the first support, the second support, and the third support.

9. The lighting device of claim 3, wherein the integral first housing and second housing are formed from a single material.

10. The lighting device of claim 5, wherein the driver chamber comprises a wall, wherein the wall comprises a third opening, and wherein the third opening corresponds to the first opening of the support, such that air is able to flow into and out of the driver chamber via the third opening in the wall of the driver chamber.

11. The lighting device of claim 6, wherein the first opening on the interior of the support is connected to a corresponding opening in the first housing, such that the exterior of the support completely covers the first opening and the corresponding opening.

12. The lighting device of claim 8, wherein the second set of external openings are located on a side of the exterior portion of the second housing that is opposite to the first set of external openings.

13. The lighting device of claim 8, wherein the first set of external openings comprises three external openings, and wherein each of the three external openings are located between two of the first support, the second support, and the third support.

14. The lighting device of claim 8, wherein the first set of external openings are shaped substantially the same as the second set of external openings.

15. The lighting device of claim 8, wherein the first set of external openings comprises at least two openings having a different shape.

16. A lighting device, comprising:

a solid state light source;

an electronic driver for the solid state light source configured to receive power from a power source and to provide the power to the solid state light source;

a first housing that contains, at least in part, the electronic driver, and comprises a support, wherein the support comprises an exterior and an interior, wherein the interior comprises a first opening; and a second housing connected to the first housing, such that the support of the first housing provides mechanical support to a bottom portion of the second housing, wherein the second housing is a heat sink for the lighting device and comprises an interior portion and an exterior portion, wherein the exterior portion comprises a plurality of external openings, wherein the interior portion comprises a floor extending across the bottom portion and a second opening formed in the floor, wherein the second opening corresponds to the first opening of the first housing, such that air entering an external opening in the plurality of external openings is able to mix with air located in the first housing by flowing through the first opening and the corresponding second opening, so as to cool the electronic driver.

* * * * *